US011526161B2

(12) United States Patent
Fang et al.

(10) Patent No.: US 11,526,161 B2
(45) Date of Patent: Dec. 13, 2022

(54) PEOPLE FLOW ESTIMATION SYSTEM AND THE FAILURE PROCESSING METHOD THEREOF

(71) Applicant: Carrier Corporation, Palm Beach Gardens, FL (US)

(72) Inventors: Hui Fang, Shanghai (CN); Xiangbao Li, Shanghai (CN); Zhen Jia, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 569 days.

(21) Appl. No.: 16/488,098

(22) PCT Filed: Jan. 18, 2018

(86) PCT No.: PCT/US2018/014156
§ 371 (c)(1),
(2) Date: Aug. 22, 2019

(87) PCT Pub. No.: WO2018/156268
PCT Pub. Date: Aug. 30, 2018

(65) Prior Publication Data
US 2020/0004232 A1    Jan. 2, 2020

(30) Foreign Application Priority Data
Feb. 22, 2017   (CN) .......................... 201710095441.8

(51) Int. Cl.
*G05B 23/02*   (2006.01)
*G06K 9/62*    (2022.01)
(Continued)

(52) U.S. Cl.
CPC ..... *G05B 23/0254* (2013.01); *G05B 23/0264* (2013.01); *G06K 9/6288* (2013.01); *G06V 20/53* (2022.01); *G06V 40/103* (2022.01)

(58) Field of Classification Search
CPC ............ G05B 23/0254; G05B 23/0264; G06K 9/6288; G06V 20/53; G06V 40/103;
(Continued)

(56) References Cited

U.S. PATENT DOCUMENTS 5,173,691 A   12/1992 Sumner
5,321,613 A   6/1994 Porter et al.
(Continued)

FOREIGN PATENT DOCUMENTS

EP    1713036 A1    10/2006
WO    2016085769 A1    6/2016

OTHER PUBLICATIONS

Hutchins, Jon, et al., "Modeling Count Data From Multiple Sensors: a Building Occupancy Model", Dept. of Computer Science, Univ. of California, Dec. 2007, 4 pages.
(Continued)

*Primary Examiner* — Mohammad K Islam
(74) *Attorney, Agent, or Firm* — Cantor Colburn LLP

(57) ABSTRACT

A human flow estimation system comprises: a sensor network comprising a plurality of sensors arranged in a to-be-estimated region for detecting the human flow; a model building module configured to build a human flow state model based on arrangement positions of the sensors, and build a sensor network model based on data of the sensors; and a human flow estimation module configured to estimate the human flow and provide a data weight of the estimated human flow based on the human flow state model and the sensor network model. The human flow estimation system further comprises a failure detection module configured to detect whether each sensor in the sensor network is abnormal, and the model building module is further configured to adjust the human flow state model and the sensor network model when an exception exists on the sensor.

12 Claims, 2 Drawing Sheets

(51) Int. Cl.
*G06V 20/52* (2022.01)
*G06V 40/10* (2022.01)

(58) Field of Classification Search
CPC ......... B66B 5/0037; G07C 9/00; G06F 30/20; H04N 7/18
See application file for complete search history.

(56) References Cited

U.S. PATENT DOCUMENTS

| | | | |
|---|---|---|---|
| 6,415,276 | B1 | 7/2002 | Heger et al. |
| 7,778,855 | B2 | 8/2010 | Holliday |
| 8,494,829 | B2 | 7/2013 | Teixeira |
| 8,775,359 | B2* | 7/2014 | Tomastik ............... G06N 7/00 706/21 |
| 9,109,896 | B2* | 8/2015 | Banaszuk ............... G01C 21/00 |
| 9,366,451 | B2 | 6/2016 | Guo et al. |
| 9,401,086 | B2 | 7/2016 | Basalamah |
| 9,520,040 | B2 | 12/2016 | Mavromatis |
| 2003/0073406 | A1 | 4/2003 | Benjamin et al. |
| 2006/0028552 | A1* | 2/2006 | Aggarwal ........ G08B 13/19608 348/169 |
| 2006/0224254 | A1* | 10/2006 | Rumi ................. G05B 13/0275 700/28 |
| 2007/0176760 | A1* | 8/2007 | Reeves ................ G08B 25/001 340/426.22 |
| 2008/0239073 | A1* | 10/2008 | Ruohonen ............. G07C 11/00 348/143 |
| 2009/0055691 | A1 | 2/2009 | Ouksel et al. |
| 2009/0222388 | A1* | 9/2009 | Hua ....................... G06V 20/53 382/103 |
| 2010/0063663 | A1 | 3/2010 | Tolstedt et al. |
| 2010/0073686 | A1 | 3/2010 | Medeiros et al. |
| 2011/0141288 | A1* | 6/2011 | Huang ................. G06K 9/6259 348/169 |
| 2012/0194873 | A1 | 8/2012 | Fu et al. |
| 2014/0226855 | A1* | 8/2014 | Sawides ............... H04W 4/021 382/103 |
| 2014/0355829 | A1* | 12/2014 | Heu ....................... G06V 10/22 382/103 |
| 2014/0372348 | A1* | 12/2014 | Lehmann ............. G06K 9/6284 706/12 |
| 2015/0197248 | A1* | 7/2015 | Breed ................ G08G 1/09626 340/905 |
| 2015/0346317 | A1* | 12/2015 | Patel ....................... H04W 4/02 455/456.1 |
| 2016/0171633 | A1* | 6/2016 | DeWalt ............ G06Q 10/06398 705/7.15 |
| 2017/0017214 | A1* | 1/2017 | O'Keeffe ............... G05B 15/02 |
| 2017/0017846 | A1* | 1/2017 | Felemban .............. G06V 20/54 |
| 2018/0029838 | A1* | 2/2018 | Fang .................... G06K 9/6254 |
| 2019/0012547 | A1* | 1/2019 | Togashi ............... G06V 40/173 |
| 2022/0009760 | A1* | 1/2022 | Woo ........................ B66F 9/205 |
| 2022/0012388 | A1* | 1/2022 | Wyrwas ................ G06V 20/56 |

OTHER PUBLICATIONS

Hutchins, Jon, et al., "Probabilistic Analysis of a Large-Scale Urban Traffic Sensor Data Set", Dept. Computer Science, Univ. California, 2010, 9 pages.

Ibarguengoytia, Pablo H., et al., "A Probabilistic Model for Information and Sensor Validation", Oxford University Press on Behalf of the British Computer Society, The Computer Journal, vol. 49(1) 2006, 14 pages.

Ibarguengoytia, Pablo H., et al., "A Probabilistic Model for Sensor Validation", Oxford Univ. Press, Oxford, UK, 2005, 8 pages.

International Search Report and Written Opinion for application PCT/US2018/014156, dated May 28, 2018, 24 pages.

Napolitano, M.R., et al., "Kalman filters and neural-network schemes for sensor validation in flight control systems", IEEE Transactions on Control Systems Technology, vol. 6, Issue 5, Abstract, 1998, 1 page.

Song, Xuan et al., "Laser-baed tracking of multiple interacting pedestrians via on-line learning", Neurocomputing, Elsevier, vol. 115, 2013, pp. 92-105.

* cited by examiner

PEOPLE FLOW ESTIMATION SYSTEM AND THE FAILURE PROCESSING METHOD THEREOF

TECHNICAL FIELD

The present invention relates to the field of human flow estimation, and more specifically, to a human flow estimation system and a failure processing method therefor.

BACKGROUND ART

A human flow estimation system plays a critical role in a variety of construction applications. Generally speaking, solutions based on sensor fusion are extensively studied and applied to estimation of human flow within a construction. However, because human flow estimation of a construction level requires a large number of sensors of different types to acquire human flow data, there is a high risk of sensor failures. It is obvious that if some sensors fail, the accuracy of the human flow estimation system will be greatly reduced because these failed sensors are still configured in the sensor network model even if they are disconnected. At present, some of the existing technologies have paid attention to the sensor failure problem in a human flow estimation system. However, these technologies mainly focus on how to detect these failed sensors and the failures that occur thereon. At present, the problem to be further solved urgently is how to process these failed sensors and ensure that the estimation result of the human flow estimation system is still reliable.

SUMMARY OF THE INVENTION

The objective of the present invention is to provide a stable and reliable human flow estimation system.

Another objective of the present invention is to provide a failure processing method for improving the stability of a human flow estimation system.

In order to realize the objective of the present invention, according to one aspect of the present invention, a human flow estimation system is provided, comprising: a sensor network comprising a plurality of sensors arranged in a to-be-estimated region for detecting the human flow; a model building configured to build a human flow state model based on arrangement positions of the sensors, and build a sensor network model based on data of the sensors; and a human flow estimation module configured to estimate the human flow and provide a data weight of the estimated human flow based on the human flow state model and the sensor network model, wherein the human flow estimation system further comprises a failure detection module configured to detect whether each sensor in the sensor network is abnormal, and the model building module is further configured to adjust the human flow state model and the sensor network model when an exception exists on the sensor.

In order to realize another objective of the present invention, according to another aspect of the present invention, a failure processing method for a human flow estimation system is further provided, wherein the human flow estimation system comprises a sensor network, a model building module, a human flow estimation module, and a failure detection module; and the failure processing method comprises: a failure detection step S100, for detecting in real time whether each sensor for detecting the human flow in the sensor network is abnormal; a model adjustment step S200, for adjusting a human flow state model and a sensor network model involved in the human flow estimation system when an exception is detected on a sensor, and not adjusting the human flow state model and the sensor network model when no exception is detected on the sensor; and a human flow estimation step S300, for estimating the human flow and providing a data weight of the estimated human flow based on the human flow state model and the sensor network model in step S200; wherein the human flow state model is built based on arrangement positions of the sensors, and the sensor network model is built based on data of the sensors.

DETAILED DESCRIPTION

Figure 1:
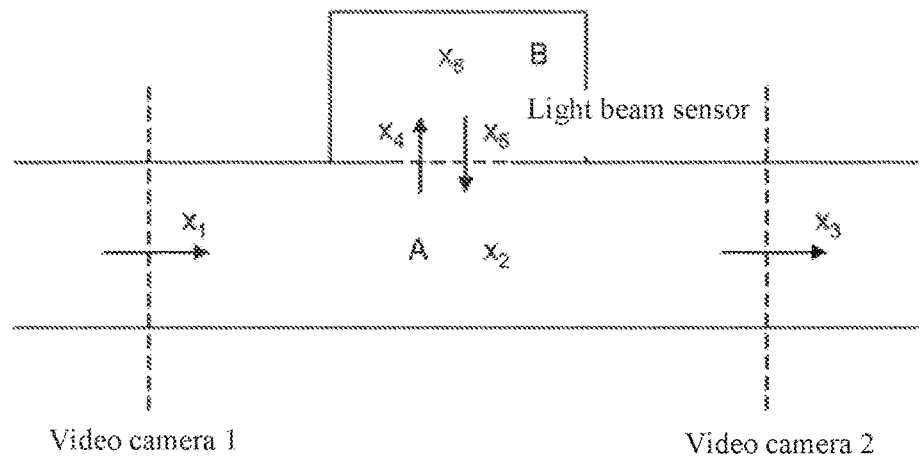
FIG. 1 is a schematic layout diagram of an embodiment where the human flow estimation system of the present invention is applied in a to-be-estimated region.

The present invention shows a human flow estimation system. The human flow estimation system comprises: a sensor network comprising a plurality of sensors arranged in a to-be-estimated region for detecting the human flow; a model building module configured to build a human flow state model based on arrangement positions of the sensors, and build a sensor network model based on data of the sensors; and a human flow estimation module configured to estimate the human flow and provide a data weight of the estimated human flow based on the human flow state model and the sensor network model, wherein the human flow estimation system further comprises a failure detection module configured to detect whether each sensor in the sensor network is abnormal, and the model building module is further configured to adjust the human flow state model and the sensor network model when an exception exists on the sensor. By adjusting the human flow state model and the sensor network model in real time, the highly flexible and stable human flow estimation system proposed in the present invention can effectively process sensor failures such that its estimation is kept in a high-precision level around the clock.

More specifically, the mode of adjustment to the human flow state model and the sensor network model when an exception exists on a sensor at least comprises two types, which will be described below one by one.

With regard to the first adjustment mode, the model building module will reduce a data weight involving a specific sensor in the human flow state model and the sensor network model when the failure detection module determines that an exception exists on the specific sensor. Alternatively, the human flow estimation module will automatically reduce a data weight of the estimated human flow of a specific sensor when an exception exists on the specific sensor. It is noteworthy that the exception mentioned in the latter is not obtained through intuitive detection, and it might be a parameter which indicates that an exception exists on a specific sensor according to a calculation result in the estimation process, and then makes an adverse inference. As a result, when the data weight of the specific sensor decreases, the contribution degree thereof in the analysis of the human flow state model and the sensor network model will become smaller, and therefore the impact thereof on the analysis result will also become smaller, which will avoid excessive impact of the failure on the accuracy of the result.

Optionally, to more intuitively present to a user the data weight corresponding to each piece of data, the human flow estimation system further comprises a credibility evaluation module configured to evaluate credibility of data from each sensor according to the data weight of the estimated human flow of each sensor provided by the human flow estimation module. Based on the credibility evaluation module, the user can monitor the state of the human flow estimation system and learn the impact of the sensor failure on the entire system, thereby deciding, according to the human flow accuracy requirements in different application scenarios, whether or when to change the sensor failure.

More specifically, when the model building module is configured to adjust the human flow state model and the sensor network model based on the Kalman filter algorithm, or when the human flow estimation module is configured to analyze the human flow state model and the sensor network model based on the Kalman filter algorithm, the data weight corresponds to a covariance value of an equation involving a specific sensor in the Kalman filter algorithm; and when the data weight of the specific sensor decreases, the covariance value in the corresponding equation increases, while the credibility decreases accordingly.

Optionally, the credibility of the estimation result can also be used in the early discovery of the possibility that a potential sensor failure might happen. For example, when the credibility of a specific sensor provided by the credibility evaluation module within a second preset time period gradually decreases, the human flow estimation system sends out a failure early warning signal for the specific sensor. As such, it is also possible to take failure processing measures in advance, and further improve the estimation accuracy.

With regard to the second adjustment mode, it is also possible to remove from the sensor network model a specific sensor that fails, and perform human flow estimation based on the adjusted sensor network model and the corresponding human flow state model, thereby providing a very flexible way of re-configuring the models in the human flow estimation system when the sensor failure occurs.

Specifically, the plurality of sensors in the sensor network model are arranged at each entrance and exit of a to-be-detected space, to divide the to-be-estimated region into a plurality of to-be-estimated subregions; and the sensor network model is configured to reflect human flow data detected by each sensor, while the human flow state model is configured to reflect the number of people within each of the to-be-estimated subregions and the human flow entering and leaving each of the to-be-estimated subregions. When the failure detection module determines that an exception exists on a specific sensor, two adjacent to-be-estimated subregions divided by the specific sensor are combined into a new to-be-estimated subregion. In this setting, although the in and out human flow data of a detection point of the failed sensor can no longer be estimated, it can be ensured that other detected data has a relatively high accuracy, thereby enabling the human flow estimation of the entire system to have a relatively high accuracy.

In addition, more exquisite improvements are also made to other components in the human flow estimation system, which will be explained one by one below.

For example, the model building module can, more elaborately, comprise: a self-adaptive configuration submodule configured to adjust the human flow state model, and a dynamic sensor fusion submodule configured to build or adjusting the sensor network model based on data of the plurality of sensors.

For another example, the model building module processes the human flow state model and the sensor network model based on the Kalman filter algorithm, the Bayesian Networks algorithm or the Dempster Shafer (DS) evidence algorithm. Alternatively, the human flow estimation module estimates the human flow based on the Kalman filter algorithm, the Bayesian Networks algorithm or the DS evidence algorithm.

In addition, as several specific examples of failure detection, the failure detection module can also determine that an exception exists on a specific sensor when data from the specific sensor is not received within a first preset time period; and/or the failure detection module can determine that an exception exists on a specific sensor when quality of data received from the specific sensor is lower than a first preset interval.

Optionally, specific types of the sensors can comprise a light beam sensor and/or a passive infrared red (PIR) sensor and/or a video camera.

An application embodiment of the human flow estimation system will be provided here in conjunction with the previously stated solutions and FIG. 1, which estimates the human flow in a to-be-estimated region in real time based on a dynamic human flow state model and through the Kalman filter algorithm. For a set of linear system, the human flow state model can be expressed as:

$$x(t+1)=Ax(t)+w(t+1);$$

$$y(t)=Cx(t)+v(t);$$

where x represents a state vector, and y represents a measured value vector; and w and v are vectors respectively representing the uncertainties of the human flow state model and the measured value model.

Referring to FIG. 1 again, an example of a simple to-be-estimated region where the human flow estimation system is applied is shown. The example reflects the first adjustment mode for the human flow state model and the sensor network model when an exception exists on a sensor. In this example, there are 2 to-be-estimated subregions: one room and one corridor. In the to-be-estimated regions, 6 states are defined:

$x_1$: the number of people entering the corridor;
$x_2$: the number of people in the corridor;
$x_3$: the number of people leaving the corridor;
$x_4$: the number of people entering the room;
$x_5$: the number of people leaving the room; and
$x_6$: the number of people in the room.

The human flow state model for the example is:

$$x_1(t+1)=x_1(t)+w_1(t+1);$$

$$x_2(t+1)=x_2(t)+x_1(t)-x_3(t)-x_4(t)+x_5(t)+w_2(t+1);$$

$$x_3(t+1)=a_1x_2(t)+w_3(t+1);$$

$$x_4(t+1)=a_2x_2(t)+w_4(t+1);$$

$$x_5(t+1)=a_3x_6(t)+w_5(t+1);$$

$$x_6(t+1)=x_6(t)+x_4(t)-x_5(t)+w_6(t+1);$$

where $a_i$ is an unknown parameter which can be taken as the ratio of people entering another region from a specific region within one period of sample time. For example, $a_1$ is the ratio of people leaving the corridor within one period of sample time; $a_2$ is the ratio of people entering the room within one period of sample time; and $a_3$ is the ratio of people leaving the room within one period of sample time.

As above, 6 equations are built through the mutual relation between the number of people in each to-be-estimated subregion and the number of people entering and leaving the to-be-estimated subregion, and therefore, the number of people in each to-be-estimated subregion and the human flow entering and leaving same can be obtained, by way of analysis and processing, through a plurality of sensors that divide these two to-be-estimated subregions.

Specifically, in the example, four sensors including two light beam sensors and two video cameras 1 and 2 are used to acquire population data and human flow data. The sensor network model here is:

$$y_1(t)=x_1(t)+v_1(t);$$

$$y_2(t)=x_3(t)+v_2(t);$$

$$y_3(t)=x_4(t)+v_3(t); \text{ and}$$

$$y_4(t)=x_5(t)+v_4(t);$$

where $y_1$ and $y_2$ are measured values from the video cameras, while $y_3$ and $y_4$ are measured values from the light beam sensors. $v_i$ is the uncertainty of the measured values.

As above, 4 equations are built through the mutual relation between the detected data of each sensor and the human flow related to the detected data, and therefore the human flow data of the part related to these sensors can be directly obtained.

Continuing with the previously stated embodiment, suppose that video camera 2 in FIG. 1 fails, and the failure type may be that the data from the camera cannot be received or the quality of the received video is rather poor. At this point, we can easily find out this type of problem and rebuild a human flow estimation system afterwards. It can be known from the previously stated sensor network model that the human flow variable corresponding to video camera 2 is $x_3$, and at this point, a relatively large error value $v_2$ can be set for the sensor model corresponding thereto. If a failure occurs, the system only needs to adjust the corresponding sensor model used in estimation, instead of changing the entire state vector space model.

To return to the previously stated model equation, it only needs to set a relatively large error value for $v_2$ in the equation $y_2(t)=x_3(t)+v_2(t)$, because only this equation involves $x_3$ (i.e., video camera 2). In the estimation method based on a Kalman filter algorithm, we set a relatively large covariance value for the model, and in the subsequent calculation of the Kalman filter algorithm, the data weight of the sensor data will be automatically reduced. In this setting, we can likewise obtain a sufficiently stable estimation result even under the circumstance that some sensors fail.

The output value of the Kalman filter comprises two parts: estimated human flow data (the human flow at the location of each sensor, for example, region A and region B shown in the figure, and the number of people in each region) and a covariance of the estimated human flow data. The covariance of the human flow data represents the accuracy of the estimated human flow data, and can be regarded as the credibility of the estimated human flow data of the human flow estimation system.

Figure 2:
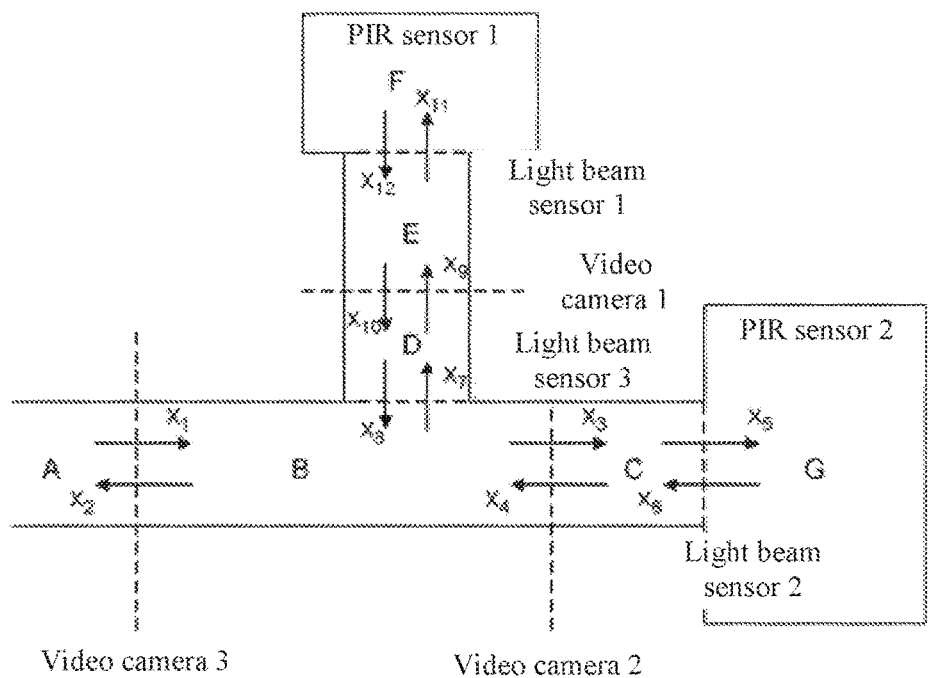
FIG. 2 is a schematic layout diagram of an embodiment where the human flow estimation system of the present invention is applied in another to-be-estimated region.
Figure 3:
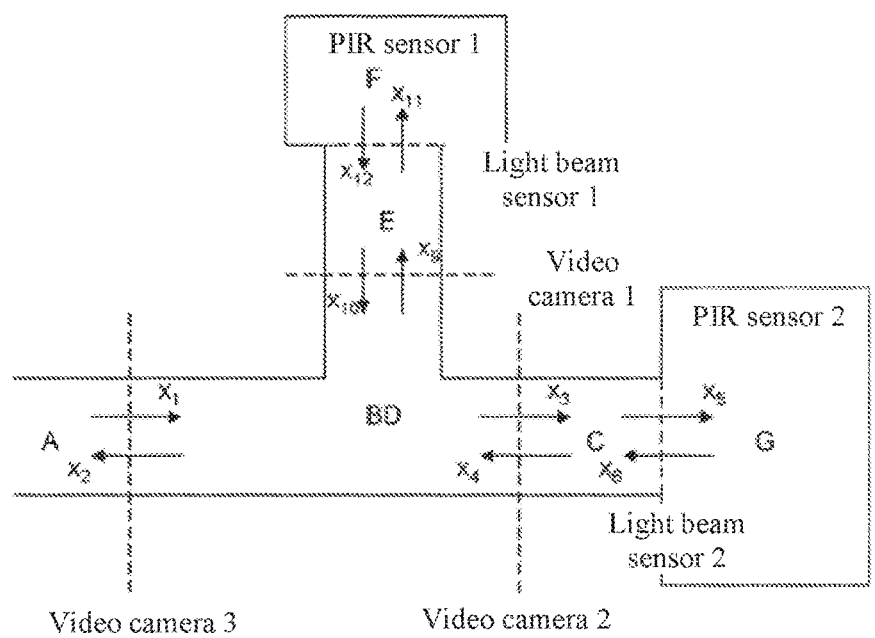
FIG. 3 is a schematic layout diagram of an embodiment where the human flow estimation system of the present invention is applied in another to-be-estimated region when a specific sensor failure exists.

In addition, an application embodiment of another human flow estimation system is provided in conjunction with FIG. 2 and FIG. 3. The example reflects the second adjustment mode for the human flow state model and the sensor network model when an exception exists on a sensor. The system likewise estimates the human flow in a to-be-estimated region in real time based on the dynamic human flow state model and through the Kalman filter algorithm. For the system, the human flow state model can be expressed as:

$$x(t+1)=Ax(t)+w(t);$$

$$y(t)=Cx(t)+v(t);$$

referring to FIG. 2 and FIG. 3 again, the example has two rooms and one T-shaped corridor; and a PIR motion sensor and a light beam sensor are arranged in each room, while 3 video cameras and 1 light beam sensor are arranged in the corridor. The arrangement of these sensors divides the to-be-estimated region into 7 to-be-estimated subregions (i.e., regions A-G shown in the figure). For the human flow and the number of people in these regions, 19 states in total are defined:

$x_1$: the number of people walking from region A to region B;

$x_2$: the number of people walking from region B to region A;

$x_3$: the number of people walking from region B to region C;

$x_4$: the number of people walking from region C to region B;

$x_5$: the number of people walking from region C to region G;

$x_6$: the number of people walking from region G to region C;

$x_7$: the number of people walking from region B to region D;

$x_8$: the number of people walking from region D to region B;

$x_9$: the number of people walking from region D to region E;

$x_{10}$: the number of people walking from region E to region D;

$x_{11}$: the number of people walking from region E to region F;

$x_{12}$: the number of people walking from region F to region E;

$x_A$: the number of people in region A;
$x_B$: the number of people in region B;
$x_C$: the number of people in region C;
$x_D$: the number of people in region D;
$X_E$: the number of people in region E;
$x_F$: the number of people in region F; and
$x_G$: the number of people in region G;

The human flow state model for the example is:

$$x_A(t+1)=x_A(t)-x_1(t)+x_2(t)+w_A(t);$$

$$x_B(t+1)=x_B(t)+x_1(t)-x_2(t)+x_4(t)-x_3(t)+x_8(t)-x_7(t)+w_B(t);$$

$$x_C(t+1)=x_C(t)+x_3(t)-x_4(t)+x_6(t)-x_5(t)+w_C(t);$$

$$x_D(t+1)=x_D(t)+x_7(t)-x_8(t)+x_{10}(t)-x_9(t)+w_D(t);$$

$$x_E(t+1)=x_E(t)+x_9(t)-x_{10}(t)+x_{12}(t)-x_{11}(t)+w_E(t);$$

$$x_F(t+1)=x_F(t)+x_{11}(t)-x_{12}(t)+w_f(t); \text{ (if PIR sensor 1 is expressed as right);}$$

$$x_F(t+1)=0; \text{ (if PIR sensor 1 is expressed as wrong;}$$

$$x_G(t+1)=x_G(t)+x_5(t)-x_6(t)+w_G(t); \text{ (if PIR sensor 2 is expressed as right); and}$$

$x_G(t+1)=0$;(if PIR sensor 2 is expressed as wrong).

Continuing to refer to the previously stated embodiment, when the failure detection module locates an exception in the data sent by light beam sensor 3 in the T-shaped corridor, the data detected by light beam sensor 3 at this time will bring enormous misleading to human flow estimation. Subsequently, the failure detection module will send out a prompt to the model building module, notifying that light beam sensor 3 fails. The model building module will automatically remove light beam sensor 3 from the sensor network model and re-divide the to-be-estimated region based on the remaining sensors. The re-divided regions are as shown in FIG. 3. Specifically, because light beam sensor 3 has already been removed, region B and region D previously divided by light beam sensor 3 will be combined into a new to-be-estimated subregion, i.e., region BD.

Then the human flow state model will be re-expressed as:

$$x_A(t+1)=x_A(t)-x_1(t)+x_2(t)+w_A(t);$$

$$x_{BD}(t+1)=x_{BD}(t)+x_1(t)-x_2(t)+x_4(t)-x_3(t)+x_{10}(t)-x_9(t)+w_{BD}(t);$$

$$x_C(t+1)=x_C(t)+x_3(t)-x_4(t)+x_6(t)-x_5(t)+w_C(t);$$

$$x_E(t+1)=x_E(t)+x_9(t)-x_{10}(t)+x_{12}(t)-x_{11}(t)+w_E(t);$$

$$x_F(t+1)=x_F(t)+x_{11}(t)-x_{12}(t)+w_F(t); \text{ (if PIR sensor 1 is expressed as right);}$$

$$x_F(t+1)=0; \text{ (if Pir sensor 1 is expressed as wrong);}$$

$$x_G(t+1)=x_G(t)+x_5(t)-x_6(t)+w_G(t); \text{ (if PIR sensor 2 is expressed as right); and}$$

$$x_G(t+1)=0; \text{ (if PIR sensor 2 is expressed as wrong).}$$

After that, the human flow estimation system will re-estimate the human flow and the number of people in each to-be-estimated subregion based on updated sensor network model and human flow state model. The previously stated embodiment realizes that a relatively high human flow estimation accuracy is still maintained when some sensors fail.

It is without doubt that the two adjustment modes can also be used in combination, for example respectively providing a set of estimated human flow data with credibility (no failed sensor is removed from the models) and a set of estimated human flow data obtained by using the updated models for analysis and processing (failed sensors have already been removed from the models), thereby realizing the complementation of the two modes. On one hand, the processed data with unchanged models can still be used so that there are relatively less alterations and the credibility of the data is clearly known, and on the other hand, the models can be slightly adjusted to acquire models of a higher accuracy and analyzed data thereof.

According to another aspect of the present invention, also provided is a failure processing method for the human flow estimation system in the previously stated embodiment. The failure processing method at least comprises:

a failure detection step S100, for detecting in real time whether each sensor for detecting the human flow in the sensor network is abnormal;

a model adjustment step S200, for adjusting a human flow state model and a sensor network model involved in the human flow estimation system when an exception is detected on a sensor; and not adjusting the human flow state model and the sensor network model when no exception is detected on the sensor; and a human flow estimation step S300, for estimating the human flow and providing a data weight of the estimated human flow based on the human flow state model and the sensor network model in step S200.

Based on the previously stated failure processing method, it is possible to correspondingly adjust the involved human flow state model and the sensor network model when a sensor in the sensor network fails, thereby reducing the impact brought by the detected data of the failed sensor, or to remove the failed sensor from the models, such that the estimation thereof is kept in a high-precision level around the clock; and it is also possible to automatically calculate the data weight of the estimation result and evaluate the credibility thereof when no sensor failure is detected, thereby making a contribution to the improvement of estimation accuracy as well.

More specifically, in the present method, the mode of adjustment to the human flow state model and the sensor network model when an exception exists on a sensor comprises two types, which will be described one by one below.

With regard to the first adjustment mode, step S200 further comprises: an exception value assignment step S210, for reducing a data weight involving a specific sensor in the human flow state model and the sensor network model when it is determined that an exception exists on the specific sensor. Alternatively, step S300 further comprises: automatically reducing a data weight of the estimated human flow of a specific sensor when an exception exists on the sensor. When the data weight of the specific sensor decreases, the contribution degree thereof in the analysis of the human flow state model and the sensor network model will become smaller, and therefore the impact on the analysis result will also become smaller, which will avoid excessive impact of the failure on the accuracy of the result.

Optionally, to more intuitively present to the user the data weight corresponding to each piece of data, the failure processing method further comprises a credibility evaluation step S400 for evaluating credibility of data from each sensor according to the data weight of each sensor provided in step S300. Based on the credibility evaluation step S400, the user can more intuitively learn the credibility of these pieces of data and make a judgment or processing.

More specifically, when in step S300 the human flow state model and the sensor network model are analyzed based on a Kalman filter algorithm, the data weight corresponds to a covariance value of an equation involving the specific sensor in the Kalman filter algorithm; and when the data weight decreases, the covariance value increases, and the credibility decreases accordingly.

Optionally, the credibility of the estimation result can also be used in the early discovery of the possibility that a potential sensor failure might occur. For example, the method can further comprise a failure early warning step S500 for sending out a failure early warning signal for a specific sensor when the credibility of the specific sensor provided within a second preset time period in step S400 gradually decreases. As such, it is also possible to take failure processing measures in advance, and further improve the estimation accuracy.

With regard to the second adjustment mode, it is also possible to remove from the sensor network model a specific sensor that fails, and to perform human flow estimation based on the adjusted sensor network model and the corresponding human flow state model, in order to further improve the estimation accuracy.

Specifically, the plurality of sensors in the sensor network model are arranged at each entrance and exit of a to-be-detected space, to divide the to-be-estimated region into a plurality of to-be-estimated subregions; and the sensor network model is configured to reflect human flow data detected by each sensor, while the human flow state model is configured to reflect the number of people within each of the to-be-estimated subregions and the human flow entering and leaving each of the to-be-estimated subregions, and step S200 further comprises: an exception processing step S220, for removing a specific sensor from the sensor network model when an exception is detected on the specific sensor, and combing two adjacent to-be-estimated subregions divided by the specific sensor into a new to-be-estimated subregion.

In addition, several more exquisite steps are also arranged for the failure processing method, which will be explained one by one below.

For example, step S200 comprises a dynamic sensor fusion sub-step for building the sensor network model based on data of the plurality of sensors. For another example, step S200 comprises a self-adaptive configuration sub-step for adjusting the human flow state model, so as to reduce a data weight involving a specific sensor in the human flow state model and the sensor network model when the failure detection module determines that an exception exists on the specific sensor.

For another example, in step S200, the human flow state model and the sensor network model are processed based on the Kalman filter algorithm, the Bayesian Networks algorithm or the DS evidence algorithm. Alternatively, in step S300, the human flow is estimated based on the Kalman filter algorithm, the Bayesian Networks algorithm or the DS evidence algorithm.

In addition, as several specific means for failure detection, step S100 comprises: determining that an exception exists on a specific sensor when data from the specific sensor is not received within a first preset time period; and/or determining that an exception exists on a specific sensor when quality of data received from the specific sensor is lower than a first preset interval.

The above examples mainly explain the human flow estimation system and the failure processing method therefor of the present invention. Although only some embodiments of the present invention are described, a person of ordinary skill in the art should understand that the present invention can be implemented in many other forms without deviating from the concept and scope thereof. Therefore, the illustrated examples and implementations are considered illustrative but not restrictive, and the invention can cover various modifications and replacements without departing from the spirit and scope of invention defined by the appended claims.

What is claimed is:

1. A failure processing method for a human flow estimation system, the failure processing method comprises:
   a failure detection step S100, for detecting in real time whether each sensor for detecting the human flow in the sensor network is abnormal;
   a model adjustment step S200, for adjusting a human flow state model and a sensor network model involved in the human flow estimation system when an exception is detected on a sensor; and not adjusting the human flow state model and the sensor network model when no exception is detected on the sensor; and
   a human flow estimation step S300, for estimating the human flow and providing a data weight of the estimated human flow based on the human flow state model and the sensor network model in step S200, the data weight providing a credibility of the estimated human flow;
   wherein the human flow state model is built based on arrangement positions of the sensors, and the sensor network model is built based on data of the sensors;
   characterized in that step S200 further comprises:
   an exception value assignment step S210, for reducing a data weight involving a specific sensor in the human flow state model and the sensor network model when it is determined that an exception exists on the specific sensor.

2. The failure processing method according to claim 1, characterized in that step S200 comprises a dynamic sensor fusion sub-step for building the sensor network model based on data of the plurality of sensors.

3. The failure processing method according to claim 1, characterized in that in step S200, the human flow state model and the sensor network model are adjusted based on the Kalman filter algorithm, a Bayesian Networks algorithm or a DS evidence algorithm.

4. The failure processing method according to claim 1, characterized in that in step S300, the human flow is estimated based on the Kalman filter algorithm, the Bayesian Networks algorithm or the DS evidence algorithm.

5. The failure processing method according to claim 1, characterized in that step S100 comprises: determining that an exception exists on a specific sensor when data from the specific sensor is not received within a first preset time period; and/or determining that an exception exists on a specific sensor when quality of data received from the specific sensor is lower than a first preset interval.

6. A failure processing method for a human flow estimation system, the failure processing method comprises:
   a failure detection step S100, for detecting in real time whether each sensor for detecting the human flow in the sensor network is abnormal;
   a model adjustment step S200, for adjusting a human flow state model and a sensor network model involved in the human flow estimation system when an exception is detected on a sensor; and not adjusting the human flow state model and the sensor network model when no exception is detected on the sensor; and
   a human flow estimation step S300, for estimating the human flow and providing a data weight of the estimated human flow based on the human flow state model and the sensor network model in step S200, the data weight providing a credibility of the estimated human flow;
   wherein the human flow state model is built based on arrangement positions of the sensors, and the sensor network model is built based on data of the sensors;
   characterized in that step S300 further comprises: automatically reducing a data weight of the estimated human flow of a specific sensor when an exception exists on the sensor.

7. The failure processing method according to claim 6, characterized in that when in step S300 the human flow state model and the sensor network model are analyzed based on a Kalman filter algorithm, the data weight corresponds to a covariance value of an equation involving the specific sensor in the Kalman filter algorithm; and when the data weight decreases, the covariance value increases.

8. The failure processing method according to claim 6, characterized by further comprising a credibility evaluation step S400 for evaluating credibility of data from each sensor according to the data weight of the estimated human flow of each sensor provided in step S300.

9. The failure processing method according to claim 8, characterized in that when in step S300 the human flow state model and the sensor network model are analyzed based on the Kalman filter algorithm, the credibility in step S400 corresponds to the covariance value of the equation involving the specific sensor in the Kalman filter algorithm; and when the covariance value increases, the credibility is lower.

10. The failure processing method according to claim 8, characterized by further comprising a failure early warning step S500 for sending out a failure early warning signal for a specific sensor when the credibility of the specific sensor provided within a second preset time period in step S400 gradually decreases.

11. A failure processing method for a human flow estimation system, the failure processing method comprises:
- a failure detection step S100, for detecting in real time whether each sensor for detecting the human flow in the sensor network is abnormal;
- a model adjustment step S200, for adjusting a human flow state model and a sensor network model involved in the human flow estimation system when an exception is detected on a sensor; and not adjusting the human flow state model and the sensor network model when no exception is detected on the sensor; and
- a human flow estimation step S300, for estimating the human flow and providing a data weight of the estimated human flow based on the human flow state model and the sensor network model in step S200, the data weight providing a credibility of the estimated human flow;
- wherein the human flow state model is built based on arrangement positions of the sensors, and the sensor network model is built based on data of the sensors;
- characterized in that the plurality of sensors divide the to-be-estimated region into a plurality of to-be-estimated subregions; the human flow state model is configured to reflect the number of people within each of the to-be-estimated subregions and the human flow entering and leaving each of the to-be-estimated subregions; and step S200 further comprises:
- an exception processing step S220, for removing a specific sensor from the sensor network model when an exception is detected on the specific sensor, and combing two adjacent to-be-estimated subregions divided by the specific sensor into a new to-be-estimated subregion.

12. A failure processing method for a human flow estimation system, the failure processing method comprises:
- a failure detection step S100, for detecting in real time whether each sensor for detecting the human flow in the sensor network is abnormal;
- a model adjustment step S200, for adjusting a human flow state model and a sensor network model involved in the human flow estimation system when an exception is detected on a sensor; and not adjusting the human flow state model and the sensor network model when no exception is detected on the sensor; and
- a human flow estimation step S300, for estimating the human flow and providing a data weight of the estimated human flow based on the human flow state model and the sensor network model in step S200, the data weight providing a credibility of the estimated human flow:
- wherein the human flow state model is built based on arrangement positions of the sensors, and the sensor network model is built based on data of the sensors;
- characterized in that step S200 comprises a self-adaptive configuration sub-step for adjusting the human flow state model, so as to reduce a data weight involving a specific sensor in the human flow state model and the sensor network model upon determining that an exception exists on the specific sensor.

* * * * *